United States Patent [19]
Hoshino

[11] Patent Number: 4,700,437
[45] Date of Patent: Oct. 20, 1987

[54] LEVER LOCK CLAMP

[75] Inventor: Yoshihiro Hoshino, Nagoya, Japan

[73] Assignee: Hoshino Gakki Co., Ltd., Japan

[21] Appl. No.: 947,818

[22] Filed: Dec. 30, 1986

[30] Foreign Application Priority Data
Jul. 23, 1986 [JP] Japan .......................... 61-113282[U]

[51] Int. Cl.4 .................... F16B 39/282; B25B 5/08
[52] U.S. Cl. ........................ 24/456; 24/514;
24/525; 24/569; 411/166; 403/22
[58] Field of Search ................ 24/456, 457, 514, 490,
24/569, 522, 525; 403/22; 411/166, 103; 248/61

[56] References Cited
U.S. PATENT DOCUMENTS

| | | |
|---|---|---|
| 528,320 | 10/1894 | Berridge ............................ 411/166 |
| 682,785 | 9/1901 | Caldwell ............................. 24/514 |
| 2,061,718 | 11/1936 | Stahl .................................. 24/525 |
| 2,604,352 | 7/1952 | Gonser ............................... 24/525 |
| 2,934,803 | 5/1960 | Allen .................................. 24/514 |
| 3,307,235 | 3/1967 | Hennings ........................... 24/569 |
| 3,537,150 | 11/1970 | Emberson .......................... 24/514 |
| 3,731,961 | 5/1973 | Becker ............................... 411/166 |
| 3,986,746 | 10/1976 | Chartier ............................. 24/569 |
| 4,056,893 | 11/1977 | Willard .............................. 411/166 |
| 4,497,092 | 2/1985 | Hoshino ............................. 24/514 |

FOREIGN PATENT DOCUMENTS

| | | | |
|---|---|---|---|
| 1277771 | 10/1961 | France ................................. 24/525 |
| 250142 | 5/1948 | Switzerland ......................... 24/569 |
| 701885 | 1/1954 | United Kingdom ................ 24/456 |

Primary Examiner—Victor N. Sakran
Attorney, Agent, or Firm—Ostrolenk, Faber, Gerb & Soffen

[57] ABSTRACT

A clamp comprises a pair of pivotally connected jaws. A spring urges the jaws apart. A screw extends from the first jaw through the second jaw and projects above the second jaw. An operating lever for clamping and unclamping the jaws is screw threadedly received on the screw above the second jaw. The screw may be locked against rotation by engagement of the screw with a seat in the first jaw. With the screw locked against rotation, rotation of the lever around the screw selectively clamps and unclamps the jaws around an article. To adjust the distance of separation between the clamping surfaces of the jaws before rotation of the lever, the screw is axially shifted off its seat on the first jaw and the screw is then rotated with respect to the operating lever to adjust the height of the operating lever along the screw. Thereafter, the screw reengages the seat in the first jaw to prevent further rotation of the screw.

13 Claims, 5 Drawing Figures

LEVER LOCK CLAMP

BACKGROUND OF THE INVENTION

The present invention relates to a clamp, and more particularly to a lever operated clamp. The clamp has particular application to the holding rod for a musical instrument drum, although it is not limited to that application.

A set of musical instrument drums includes individual drums which are each supported by a respective rod on a drum holder. For example, the tom-tom in a drum set has a holder rod that is attached to the exterior of the body of the drum by a clamp.

Known clamps include a movable and a stationary jaw. The movable jaw is tightened against the stationary jaw, to clamp the rod between them, by means of a bolt and/or nut, and the like. The rod may be inserted into an eye-bolt, and the eye-bolt is pulled for both tightening and fixing the rod.

In the case of a drum set with a number of drums assembled in one location and near one another, it is preferable that tightening and loosening of a clamp for holding a drum to a respective holding rod be carried out simply, e.g. in a one touch fashion, if possible. This is easier with the holder rod for a musical instrument because the amount of tightening and loosening of the clamp for fixing or separating the instrument from the rod is slight.

Also, where the holder rod is clamped by movement of a locking lever, both for improved appearance and for user convenience so that the user can tell by rapid observation whether the holder rod is fully clamped, it is desirable that the orientations of the locking levers for all the clamps for all the drums in the set respectively correspond both for the unclamped and the clamped conditions, e.g. the levers extend laterally outward for the unclamped and downward for the clamped conditions. However, as not all drum holder rods are of precisely the same thickness or cross-section, and as not all clamps are identical, even if the clamps for all the drum holders are substantially uniform, nonetheless if clamping is accomplished by twisting of the locking lever on a screw threaded shaft, it is likely that the various levers will be at somewhat different orientations after they have been tightened to securely clamp the holding rod, and when they are loosened.

SUMMARY OF THE INVENTION

Accordingly, it is the primary object of the present invention to simply clamp a rod or other article.

Another object of the invention is to clamp to the rod with a clamp having a rotatable locking lever.

A further object of the invention is to provide a clamp with a locking lever whose orientations in the clamped and unclamped positions can be precisely set.

Another object of the present invention is to provide such a clamp for each of the drums in a drum set, or the like.

Yet another object of the invention is to enable such a clamp to be clamped or unclamped in a simple, one step operation.

In order to accomplish the foregoing and other objects, the present invention provides a clamp that is comprised of two jaws, one preferably being fixed and the other being movable, although it is primarily necessary that the two jaws be relatively movable. At one end of each jaw, the jaws are pivoted together around a common axis. The other ends of the jaws are free to move together and apart. Clamping occurs in the intermediate clamping region between the ends of the jaws, and a rod or article to be clamped is disposed in an appropriate receptacle in the jaws, e.g. a depression or notch, shaped to receive and securely hold the rod at a desired orientation in the clamp.

Biasing means between the jaws normally urge the movable jaw to pivot away from the fixed jaw and thereby bias the jaws to the unclamped condition.

At the free, that is unconnected, ends of the jaws, a screw extends freely through an opening through the movable jaw and through an opening in the fixed jaw. The screw has a base which is captured below a seat in the fixed jaw. The seat in the fixed jaw faces away from the movable jaw. The threaded shank of the screw extends above and outside the movable jaw. The screw includes, preferably at the end projecting out of the movable jaw, means for receiving a tool for rotating the screw, such as a screw driver tip receiving groove, or other appropriate tightening tool receiving means.

The base of the screw beneath the seat in the fixed jaw is in the form of a seat plate. There are cooperating engagement means on the seat plate and on the seat in the jaw which are adapted for engaging and preventing rotation of the screw when the seat plate is pressed against the seat. However, when the screw is moved inward of the movable jaw, the seat plate is raised off the seat of the fixed jaw which disengages the engagement means and enables the screw to be rotated by an appropriate tool. The engagement means on the seat plate and on the seat may comprise a plurality of notches defined in the periphery of the seat plate and at least one protrusion in the seat adapted to enter the one of the notches in the seat plate for locking the screw against rotation. Alternately, a plurality of the protrusions may be defined in the seat. Alternately, the protrusions may be defined on the seat plate at the base of the screw while the notches are defined in the seat. Other screw rotation preventing engaging means may be developed by one skilled in the art.

The locking lever for clamping the jaws to the holding bar and for releasing that clamping is screw threadedly held upon the threaded shank of the screw above the movable jaw. With the engagement means of the seat and seat plate engaged, which holds the screw against rotating, rotation of the lever in one direction, e.g. clockwise, moves the lever down along the shank against the movable jaw and moves the movable jaw toward the fixed jaw, which would clamp a rod between the jaws. Correspondingly, reverse rotation of the lever moves it up along the shank to enable the biasing means between the jaws to push the movable jaw slightly away from the fixed jaw, unclamping the holding rod. Rotation of the lever over a small angle, such as 90°, is sufficient to move from the clamped to the unclamped condition, and vice versa. However, that orientation of the locking lever which causes the jaws to clamp the holding rod is normally not predictable. To achieve the object of the invention, namely to have the orientation of the locking lever be precisely set for both the clamped and the unclamped conditions, the screw running through the lever is rotated by a tool. This moves the screw along the operating lever. The screw is rotated while the lever is held, for instance, at the clamping orientation until the jaws are spaced precisely for clamping the rod.

Rotation of the screw with the lever at the clamping orientation is done while the clamp is not clamping a holding rod. The screw is pushed in a direction to raise the seat plate of the screw off the seat in the fixed jaw which frees the screw to rotate. Then the screw is rotated, and with the locking lever held stationary, this adjusts the height of the lever along the screw. The lever determines the distance between the clamping surfaces of the jaws, whereby adjustment of the height of the lever along the screw will determine the orientation of the lever with respect to the clamp at a particular spacing apart of the jaws, that is, the spacing at which the holding rod is clamped. By trial and error, the precise desired spacing of the jaws is obtained for the locking lever at a desired orientation during the clamping and the unclamped conditions.

Once the distance between the jaws is adjusted for the thickness of the particular holding rod or other article to be clamped, clamping of the article by the jaws can be obtained by slight rotation of the operating lever in one direction, and slight reverse rotation unclamps the article. Only a simple, one step operation is needed. If a different item to be clamped is substituted and/or the thickness of the item being clamped changes, by readjustment of the screw, the clamping orientation of the operating lever can be maintained constant.

Other objects and features of the present invention will become apparent from the following description of a preferred embodiment of the invention considered in conjunction with the accompanying drawings.

BRIEF DESCRIPTION OF THE DRAWING FIGURES

FIG. 1 an exterior, front view of a clamp according to the invention in use;

DESCRIPTION OF THE PREFERRED EMBODIMENT

Figure 1:
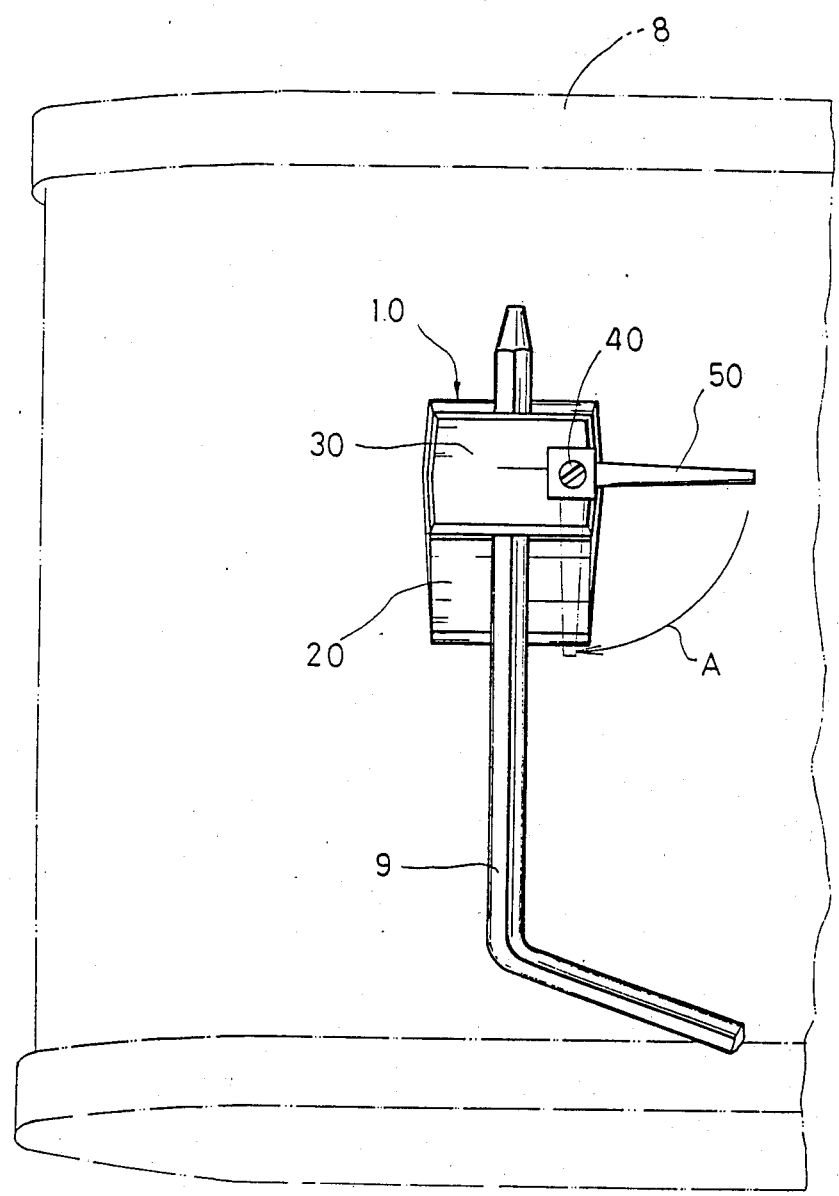

The clamp 10 according to the present invention comprises a pair of relatively movable jaws, including the fixed jaw 20 and the movable jaw 30, which are pivoted together at the pivot 15 at the jaw ends 12 and which move apart and together at the jaw ends 13 to clamp a holding rod 9 at the intermediate portion 11 of the clamp between the jaw ends 12 and 13. The screw 40 extends from a downwardly facing seat 25 in the fixed jaw 20, through the fixed jaw and through the movable jaw 30. The threaded shank of the screw projects above the movable jaw and receives on it the internally screw threaded rotatable clamping lever 50, whose rotation selectively clamps and unclamps the jaws around the rod 9. Rotation of the screw 40 with respect to the jaws determines the orientations of the lever 50 at which the jaws clamp to and unclamp from the holding rod.

Figure 2:
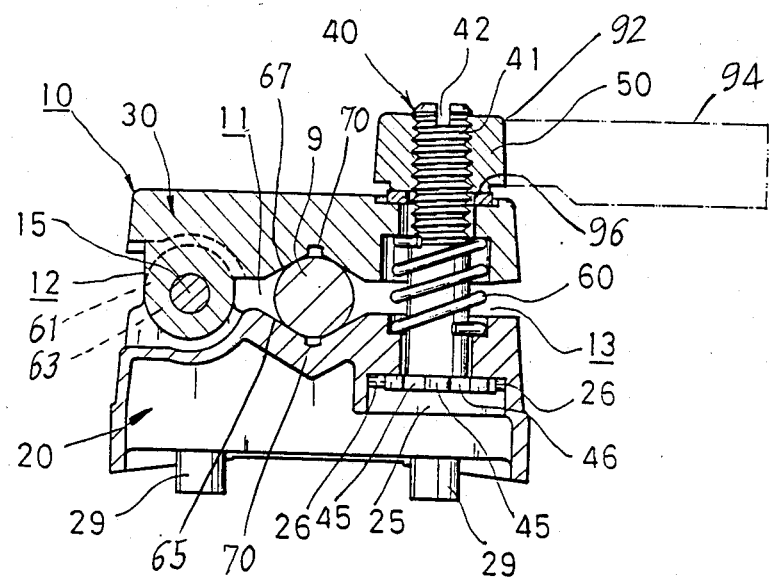
FIG. 2 is a cross sectional side view of the clamp.

Referring to FIGS. 1 and 2, a conventional tom-tom drum 8 has the underside of fixed jaw 20 installed on its side wall by the fixing screws 29. A conventional holder rod 9 extends from a conventional drum holder (not shown) into the clamp. There may be two tom-toms near each other, both held on a respective rod extending from the common holder.

At one lateral side at one end of the fixed jaw 20 is an upwardly projecting flange 61, and at the corresponding lateral side at the same end of the movable jaw 30 is a downwardly projecting flange 63. There are corresponding flanges, not shown, on the opposite lateral sides of the jaws 20 and 30. These flanges have respective holes through them which are aligned. The axis pin 15 extends through the aligned holes in the overlapped flanges 61, 63 for pivotally connecting the first ends of the jaws 20, 30. Intermediate the lengths of the jaws 20, 30, away from the axis 15, both jaws have respective inclined wall notches 65, 67 which form a nest for the clamped holding rod 9. Grooves 70 at the apexes of the notches 65, 67 firmly position and orient the rod 9 which may have a number of ridges around its periphery that are received in the grooves 70, as can be seen in FIG. 1.

Figure 3:
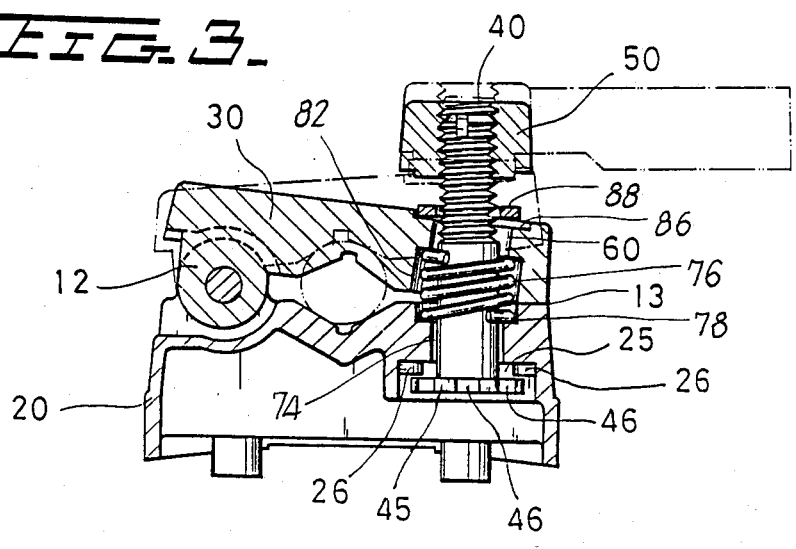
FIG. 3 is a similar view to FIG. 1 with the clamp in the adjustment mode.
Figure 4:
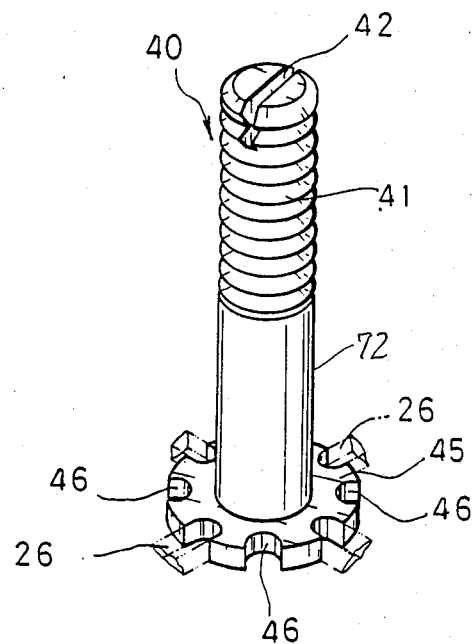
FIG. 4 is a perspective view of the adjustment screw for the clamp.
Figure 5:
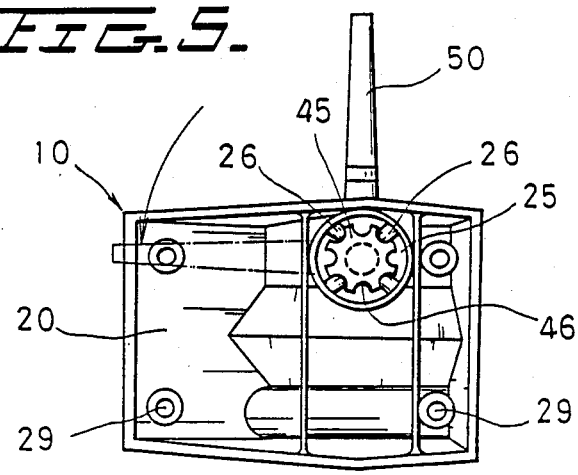
FIG. 5 is a bottom plan view of the clamp.

Referring to FIG. 4 and to the other Figures, the screw 40 which is operated to adjust the distance between the jaws 20, 30 at a particular orientation of the lever 50, is disposed near the opposite ends 13 of the jaws from the axis 15. The screw 40 is oriented transversely to the axis 15. The screw 40 includes a shank 72 which is threaded at 41 toward its free end which projects above the movable jaw 30, as seen in FIGS. 2 and 3. At the upper tip of the screw 40 is a groove 42 which receives the driving tip of a screwdriver. Alternate tool receiving means may be provided at the tip of the screw 40 for enabling rotation of the screw for adjusting the lever 50.

At the base of the screw 40 is disposed a circular seat plate 45 with a diameter greater than that of the shank 72 of the screw. The seat plate has a plurality of notches 46 in its periphery for cooperating with respective below described protrusions 26 on the seat 25 of the fixed jaw 20. Eight notches 46 at equally spaced locations are indicated. The number of notches and their spacing may be adapted as desired. When the notches 46 and the protrusions 26 cooperate, the screw 40 is prevented from rotating. Also, rather than the protrusions being provided on the seat and the notches in the seat plate, this relationship may be reversed, with the protrusions being provided on the seat plate.

The lower, fixed jaw 20 at its underside away from the movable jaw has a depression which defines a circular seat 25. Cast into the floor of the seat are at least one and more usually a plurality of the protrusions 26, typically fewer in number than the notches 46, and which are shaped complementary to the notches 46 and project into the notches when the seat plate and seat are moved together.

Above the seat 25 is a narrow bore 74 through the fixed jaw 20 through which the shank 72 of the screw passes with clearance up to the movable jaw. The movable jaw 30 has a larger diameter bore 76 extending through it through which the shank 72 extends. The diameter of the bore 76 is selected so that there is clearance between the surrounding wall of the bore 76 and the screw shank 72 within it to prevent the jaw 30 from binding on the screw as the jaw pivots between its extreme positions, for example, the positions illustrated in solid line and broken line in FIG. 3.

At the top of the fixed jaw at 78 and at the bottom of the movable jaw at 82 are defined enlarged diameter spaces 78, 82 providing clearance for the coiled tension spring 60 within them which presses against the floors of the spaces 78, 82 in the fixed and movable jaws. The spring 60 normally urges the movable jaw 30 to pivot away from the fixed jaw 20 toward the unclamped position, and the below described lever 50 moves the jaws together to clamp the holding bar 9. The spring 60 may in addition be attached to the screw 40 itself for urging the screw 40 upward to the position shown in FIG. 2, with the seat plate 45 and seat 25 in engagement.

At the top of the jaw 30 is a groove 86 in which is received the clamp jaw locking lever pressure washer 88, against which the locking lever 50 rubs and presses as the lever 50 is rotated to move the movable jaw toward the fixed jaw.

The clamp jaw locking or operating lever 50 includes the central internally threaded annular hub 92 which is threaded onto the threaded shank 41 of the screw 40. The lever 50 further includes the radially elongate handle 94 by which the lever may be rotated around the threaded part 41 of the screw 40. The underside 96 of the hub 94 contacts and rubs the washer 88 as the lever is rotated over the pathway indicated by arrow A in FIG. 1. The position of the lever hub 92 along the screw 40 determines the maximum extent to which the movable jaw 30 can open with respect to the fixed jaw, and this is set so that the jaws 30 and 20 can clamp on the holding rod 9. With reference to FIG. 1, it is desirable to, for example, have the operating lever handle 49 extend outwardly of the clamp horizontally, as shown in solid line in FIG. 1 when the clamp is not clamping the rod 9, and to have the operating lever rotated 90° over the angle indicated by arrow A to the vertically downward orientation when the clamp jaws are clamped to the holding rod 9. It is necessary to adjust the individual clamp for the individual holding rod to accomplish this result. This is permitted because both the holding rod 50 and the screw 40 are independently rotatable with respect to each other and with respect to the jaws of the clamp.

The procedure to set the initial unclamped position of the operating lever 50 projecting to the side, as illustrated in FIGS. 1-3 and, more important, to set the clamping position of that lever pointing downward, as in FIG. 1, is now described. With the holding rod 9 separated from the clamp, as in FIG. 3, the screw 40 is pushed down by a tool (not shown) inserted into the groove 42 to move the seat plate 45 off the seat 25 and disengage the notches 46 from the protrusions 26, to the position of the screw shown in FIG. 3. The movable jaw is shifted down toward the fixed jaw against the bias of the spring 60 while the screw 40 is pushed into the fixed jaw to raise the seat plate 45 off the seat 25. With the lever 50 manually held against rotation, the screw 40 is rotated, either clockwise or counterclockwise, as necessary, with respect to the lever 50. This adjusts the height of the lever 50 along the screw 40. Once the desired height of the lever along the screw has been set, and the adjustment force applied to the screw is released, the movable jaw 30 moves up, for example, from the solid line to the broken line position in FIG. 3. This raises the lever 50 which raises the screw 40 to bring the notches 46 of the seat plate into cooperative engagement with the protrusions 26 in the seat 25. This establishes the terminal open position for the clamping jaws.

When the correct height has been set so that the lever 50 has the illustrated clamped and unclamped positions of FIG. 1, no further adjustment of the screw 40 is needed, and rotation of the lever 50 itself will effect the clamping and unclamping. These adjustments are made before a musical performance and while the instrument stand with a plurality of drums, or the like, is being set up. At the performance, all of the levers for all of the clamps could initially be pointing in the same respective direction for the unclamped condition and in the same respective direction for the clamped condition, as that has been preset for the particular holding rod being held in each clamp.

The present invention makes it possible to adjust even to minute degrees the extent to which the aws are opened with respect to each other in the unclamped condition with the locking lever at a preset orientation. Clamping and unclamping respectively are thereafter performed in a single touch operation, requiring only a predictable partial circle rotation of the locking lever, with uniformity in the orientations of the locking levers, if desired. Further, any changes in the thickness of the article being clamped can be easily adjusted for by appropriate adjustment of the screw 40 with respect to the lever 50. Due to the change in the height of the lever 50 along the screw 40, the locking position of the locking lever can be held constant among all the locking levers of all the clamps, even where the thickness of the article being clamped, such as a holding rod, is changed. This is especially desirable where the operating range of one lever is restricted in its relationship with respect to the other levers, that is, where all levers should be oriented in the same respective directions for the clamped and unclamped conditions. In addition, this tends to make the entire locking arrangement for a plurality of clamps positioned near each other more attractive in appearance.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A clamp comprising first and second jaws which include clamping surfaces that face each other; the jaws being pivotally attached for their clamping surfaces to pivot toward and away from one another around a pivot axis;

a threaded screw supported to the first jaw and extending to the second jaw in a direction transversely to the direction of the pivot axis;

a locking lever screw threadedly supported on the screw and engageable with the second jaw, such that rotation of the locking lever around the screw with the screw held to prohibit its rotation and with the locking lever engaging the second jaw, moves the locking lever against the second jaw for moving the second jaw selectively toward and away from the first jaw as the locking lever is respectively rotated in a first and second direction;

first engagement means on the first jaw and cooperating second engagement means on the screw, such that when the first and second engagement means are in engagement, the screw is prohibited from rotation by that engagement; the screw being shiftable axially with respect to the first jaw for separating the second engagement means from the first engagement means, thereby freeing the screw for rotation with respect to the first jaw, such that upon rotation of the screw with respect to the lever, the axial position of the lever along the screw is adjustable for adjusting the orientation of the lever with respect to the second jaw in any particular degree of separation of the clamping surfaces of the jaw; and the screw also being shiftable axially for engaging the first and second engagement means.

2. The clamp of claim 1, further comprising biasing means normally urging the first and second jaws apart.

3. The clamp of claim 1, wherein the screw is of a length to extend through and outside of the second jaw and the locking lever is on the screw outside the second jaw.

4. The clamp of claim 1, further comprising means on the screw adapted for receiving a tool for rotating the screw with respect to the lever.

5. The clamp of claim 1, wherein the screw is of a length to extend through and outside of the second jaw and the locking lever is on the screw outside the second jaw; the screw having a free end outside the second jaw with a groove therein for receiving a screw rotating tool for rotating the screw with respect to the lever.

6. The clamp of claim 1, wherein the screw includes a seat plate in which the second engagement means are disposed, and the first jaw has a seat defined therein against which the seat plate of the screw engages when the first and second engagement means are in engagement, the first engagement means being at the seat.

7. The clamp of claim 6, wherein one of the first and second engagement means comprises a notch and the other of the first and second engagement means comprises a protrusion, and the protrusion engaging into the notch for prohibiting rotation of the screw with respect to the lever.

8. The clamp of claim 6, further comprising biasing means for normally urging the first and second jaws apart and, with the locking lever engaging the second jaw, for biasing the screw to engage the seat plate with the seat.

9. The clamp of claim 8, wherein the biasing means comprises a compression spring extending between the first and second jaws for urging the first and second jaws apart.

10. The clamp of claim 1, wherein the first engagement means comprises a protrusion on the first jaw and the second engagement means comprises a notch in the screw, the protrusion and notch being shaped in a generally complementary fashion for permitting the protrusion to be received in the notch for prohibiting rotation of the screw with respect to the first jaw with the protrusion in engagement with the notch.

11. The clamp of claim 10, wherein there are a plurality of the notches defined in the screw for engaging the protrusion at any of a selected number of rotative positions of the screw with respect to the first jaw.

12. The clamp of claim 1, further comprising means for supporting the first jaw fixed against movement, and for enabling the second jaw to be movable to pivot with respect to the fixed first jaw.

13. The clamp of claim 1, wherein the pivot axis is generally at one end of the first and second jaws, the screw is generally at an opposite end of the jaws and the clamping surfaces are shaped for clamping an article disposed between the pivot axis and the screw along the jaws.

* * * * *